(12) United States Patent
Roberts

(10) Patent No.: US 8,606,704 B2
(45) Date of Patent: Dec. 10, 2013

(54) CUSTOMER BILLING IN A COMMUNICATIONS NETWORK

(75) Inventor: Timothy Roberts, Thaxted (GB)

(73) Assignee: Apple Inc., Cupertino, CA (US)

( * ) Notice: Subject to any disclaimer, the term of this patent is extended or adjusted under 35 U.S.C. 154(b) by 2547 days.

(21) Appl. No.: 10/720,856

(22) Filed: Nov. 24, 2003

(65) Prior Publication Data
US 2004/0125755 A1  Jul. 1, 2004

Related U.S. Application Data

(63) Continuation-in-part of application No. 10/185,134, filed on Jun. 28, 2002, now abandoned.

(60) Provisional application No. 60/355,221, filed on Feb. 8, 2002.

(51) Int. Cl.
*G06Q 40/00* (2012.01)
(52) U.S. Cl.
USPC .......................................... 705/40; 717/113

(58) Field of Classification Search
USPC .............. 705/65; 726/1, 2, 4, 5, 9, 20, 26, 31; 713/168, 172, 159, 166
See application file for complete search history.

(56) References Cited

U.S. PATENT DOCUMENTS

| | | | | |
|---|---|---|---|---|
| 5,819,092 | A * | 10/1998 | Ferguson et al. | 717/113 |
| 2002/0161601 | A1 * | 10/2002 | Nauer et al. | 705/1 |
| 2003/0014367 | A1 * | 1/2003 | Tubinis | 705/64 |
| 2003/0041022 | A1 * | 2/2003 | Battle et al. | 705/39 |
| 2003/0086545 | A1 * | 5/2003 | Ruckart et al. | 379/114.2 |

* cited by examiner

*Primary Examiner* — Olabode Akintola
(74) *Attorney, Agent, or Firm* — Meyertons, Hood, Kivlin, Kowert & Goetzel, P.C.

(57) ABSTRACT

In a packet communications network, e.g. a third generation wireless network, combined billing of a user is provided for the delivery of communications services to that user and for the on-line purchase of goods and services by the user via the communications network. A set of rules is provided and a respective billing tariff and account is determined from the rules and each packet address. Credit transfers are made between user accounts and the accounts of goods/services supplies held in a common database.

17 Claims, 1 Drawing Sheet

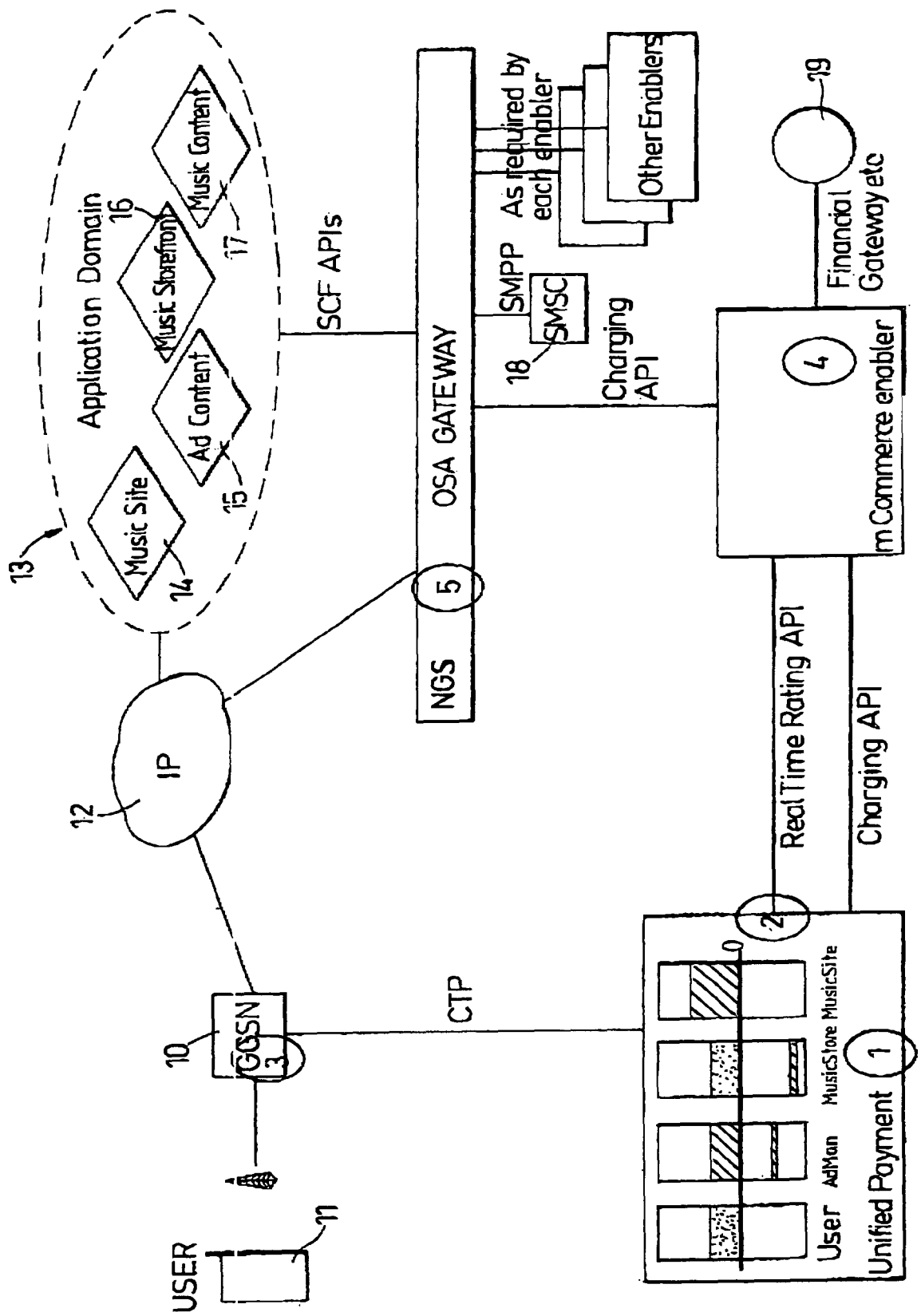

CUSTOMER BILLING IN A COMMUNICATIONS NETWORK

RELATED APPLICATIONS

This application is a Continuation in Part of U.S. patent application Ser. No. 10/185,134 filed Jun. 28, 2002, now abandoned which itself is the regular filing of provisional patent application No. 60/355,221 filed Feb. 8, 2002. The contents of both these applications are incorporated herein by reference.

FIELD OF THE INVENTION

This invention relates to systems and methods for billing or tariffing users of a communications network for the use of network resources and services, and for the purchase of goods and services via the network.

BACKGROUND OF THE INVENTION

In the field of communications, competitive billing or tariffing for use of network resources and services is a key part of attracting and maintaining a strong customer base. With the current migration towards data and multimedia services, billing or tariffing will increasingly become a major factor in encouraging or suppressing the take up and provision of these new technologies and the capabilities they offer. This is a particular problem with the introduction of third generation (3G) wireless networks which are capable of providing the user with a wide variety of services in addition to the conventional voice and text traffic. In addition, in the data world, there are now new opportunities for innovative tariff models based not only on duration or volume of data but also on the value delivered by the data. This value can be independent of volume or duration. For example, a video delivered at voice call bandwidth rates would be far too expensive to be commercially viable and yet a typical text message via SMS (short message service) containing less than a couple of hundred bytes of data, can be charged at a disproportionately high rate. In addition to what is being charged, the data world will also add in new stakeholders in the value chain such as content providers and new business models with the network operator being wholesaler, retailer, credit broker or channel partner as required.

In the Wireless space, the existing billing activities tend to be focused on charging for data transmission at the granularity of the PDP (Packet Data Protocol) context (i.e. the connection of the device to the network). IP services are run over this connection. Since IP (Internet Protocol) is designed to multiplex service delivery, the same PDP context may be used to use multiple services possibly concurrently. The existing billing work in OSA (Open Services Architecture) under CAMEL (Customized Applications of Mobile-Network Enhanced Logic) and IMS (Internet Protocol Multimedia Subsystem) does not allow the billing system to differentiate between different services on the same PDP context.

In the IP space, traffic analysis is becoming real, but typical deployments are not centred on data or content based billing since there is not an appropriate charging relationship with the end user. As such, the service provider typically enters into a specific relationship with the end user typically via credit cards. This is limited by the consumers' willingness to provide credit card details, lack of anonymity and the effective disenfranchisement of consumers unable to get credit cards (e.g. those under 18 years of age). Industry initiatives for pay up front and trusted third party payment are beginning to emerge but do not correlate with the data traffic due to a focus on wireline where access charges are either via fixed monthly payment or are quite low.

In the wireless space, access charges are high (e.g. GPRS (General Packet Radio Service) where each additional Megabyte will cost around $5 under current pricing schemes in comparison to 10-20 cents via local call rate ISP (Internet Service Provider) dial-up access). Dial-up is also quicker and more reliable. Wireless access is also error prone and errors result in retransmissions which are also charged—thus the user pays twice (access costs and purchase price) and pays extra when the service is poor.

Correlation in real-time is complex since the billing system cannot have knowledge of all the elements that may be involved in delivery of a particular service, or when complete data on a service interaction will be complete. However, for real-time credit management, the cost of service provision must be applied in a short timescale (minutes) and preferably on-line so that service can be immediately discontinued on expiration of credit.

With the increased value that m-commerce brings, real-time operation is critical for credit risk management.

In addition to the business model changes that are being introduced, there is a need for the infrastructure to support multiple devices, family accounts, mixed business and personal accounts with different billing models for each mix of fixed and wireless access and voice/data, and handle roaming between different networks. Consequently an operator's ability to offer a coherent payment services architecture that enables new services to be quickly launched and rating schemes to be easily modified depending on market conditions, vouchers, discounts, mark-ups, promotions, and so forth will be crucial to that operator's competitive position and future profitability.

Traditionally, postpaid billing has been employed for use of communications resources and services, i.e. the user receives a monthly or quarterly bill for the services that have been delivered in that period. The success enjoyed by the recently introduced prepaid billing, in which the user purchases credit for future use, is in part due to its ability to handle charging in real time without the need for a downstream billing infrastructure. Migration to 3G networks will form an overlay of new services and capabilities that are expected to approach, if not exceed, the capabilities of traditional billing methods. This problem is further exacerbated in networks having a mixture of prepaid and postpaid customers and which thus have an added complexity in the billing procedure

OBJECT OF THE INVENTION

An object of the invention is to provide an improved billing arrangement and method for a communications network.

SUMMARY OF THE INVENTION

According to a first aspect of the invention there is provided a method of billing a communications network user for goods or services associated with the transport of packet traffic from that communications network into a packet communications network, each packet having an address, wherein the method comprises; providing a set of rules, and determining from said rules and each packet address, a respective billing tariff and account for that packet.

The billing costs are debited from the relevant customer account. Prepaid customers may have a zero credit limit.

Postpaid customers may be accommodated in the system by allowing their accounts to go into debit e.g. to a prearranged limit.

According to another aspect of the invention there is provided apparatus for billing a communications network user for goods or services associated with the transport of packet traffic from that communications network into a packet communications network, the apparatus comprising: means for providing each packet with an address, a store having a set of rules, and a packet analyzer for determining from said rules and each packet address, a respective billing tariff and account for that packet.

According to another aspect of the invention there is provided a method of on-line shopping in which the cost of purchased goods or services are debited to a customer prepaid or postpaid account and a corresponding credit is applied to an account held by the provider of those goods or services.

The network operator may receive a fixed service fee per transaction or a service fee based on the value of the transaction.

In a preferred embodiment in which the packet communications network comprises a third generation wireless network, combined billing of a user is provided for the delivery of communications services to that user and for the on-line purchase of goods and services by the user via the communications network. A set of rules is provided and a respective billing tariff and account is determined from the rules and each packet address. Credit transfers are made between user accounts and the accounts of goods/services supplies held in a common database.

The method provides billing for such purchases to the purchaser's telephone account and thus enables a purchaser to complete transactions without the need for a credit or debit card. The method also has the advantage that a system user need never disclose his/her credit/debit card details thus reducing the risk of fraudulent transactions.

The methods may be performed by or under the control of software in machine readable form on a storage medium.

The system proposes a way to coordinate billing data in real-time so that the operator can provide for a number of basic billing scenarios which involve correlating standard usage based billing techniques (volume and duration) with e-commerce purchases and event based billing.

The finer grained charging information is achieved via the analysis of packets, preferably at the GGSN (Gateway GPRS Service Node). This is coordinated with the service being accessed via configuring rules based on the destination of the service as described by URL (Universal Resource Locator) or IP address and port number of the server. Further discrimination can be applied via the protocol being used if required. Since this knowledge is provisioned into the system, the specific destination can be used to determine charging without recourse to other systems and hence can be done in real-time. Via split tariffing (rating which applies to more than one account) multiple parties may pay for any given chargeable service and hence a full range of business models can be applied. By performing all charging events in real-time (by extension of the Prepaid model) full credit management facilities may be supported. Use of real-time accounts for suppliers and commercial partners means that credit management can apply to them too and not just for subscribers. Allowing negative balances on prepaid accounts and by issuing monthly bills for payment, existing prepaid systems can support the postpaid users thereby unifying all accounts to a single system.

With this infrastructure in-place, the e-wallet concepts can be applied with the operator managing the wallet to provide a single point of trust and thus eliminate the need for entering credit card details with each purchase. By allowing the telephony account (prepaid or postpaid) to be debited, the operator can offer this form of credit as a payment method to merchant partners. Since prepaid can now be used to pay for m-commerce transactions, the requirement for credit cards is eliminated thereby enabling all subscribers to access this facility.

BRIEF DESCRIPTION OF THE DRAWINGS

An embodiment of the invention will now be described with reference to the accompanying drawing in which the single FIGURE is a schematic diagram of a tariffing and payment architecture.

DESCRIPTION OF PREFERRED EMBODIMENT

Referring to the drawing, this shows in schematic form a wireless network, e.g. a 3G network providing user access from a terminal 11 via a gateway GPRS serving node (GGSN) 10, an IP network 12 to an application domain 13 from which goods or services may be delivered to the user. The application domain contains a number of servers including, for example, a music site 14, an advertisement content server 15, a music storefront 16 and a music content server 17. Transactions with these different servers will attract different billing rates, including where appropriate a zero rate, to the user and the site owner. Further, the user may be offered credits for some transactions. The transactions can also include the transfer of credit from one account to another, e.g. as part of a transaction for the purchase of goods or services.

As illustrated in the drawing, the functionality of the billing system is split into five main components:

A Unified Account Database 1 supports real-time updates to user balances including the usual reservation model supported by today's prepaid solution. This component (shown as part of unified payment in the drawing) also provides management and user access to account balance information for customer care functions. This component is capable of being scaled to support all the subscriber base for the operator and, preferably, also an account for each third party partner through which the various business models can be supported. Balances are capable of being positive or negative and have a credit or debit limit (preferably soft and hard) per transaction, per user and per account which is enforced in real-time. Where a credit limit is reached, the account database may initiate credit limit increase request and/or recharge opportunity via credit/debit card. Positive authorization, reservation and confirmation features are provided. The account database has all the attributes of a real time accounting system in terms of its robustness and reliability.

Real-time Rating Engine 2 provides the single point for all rating and tariffing data including such capabilities as voucher management and advice of charge. Advantageously, the real time rating engine is incorporated within the unified payment function. This engine also applies various operator level policies such as discounting, mark-up, taxation, etc. Its function is to accept charging events with relevant data (such as time of day, event type, subscriber, merchant, possibly dollar value) and return the value to be charged to the customer along with any details about charges to be applied to other accounts e.g. merchant for revenue share. Note that charges may comprise credits or debits. The real time rating engine may be incorporated in the unified account database.

Real-time in-line packet analyser 3 handles the usage based aspects of the tariff regime. This function appeal to both the previous two components to determine both the price of any particular packets and whether the user has the credit to allow the interaction to proceed and if not to stop the session. As indicated in the drawing, the packet analyser is conveniently incorporated in the GGSN.

Interface into the financial institutions or mcommerce enabler 4 offers credit/debit card capabilities. This function also manages the selection of the payment method (Wallet functionality) and hence interfaces to the rating engine 2 to determine the net price to the user for any event and the account database when this is the preferred method of payment. The mcommerce enabler 4 also provides access to financial gateways 19.

OSA Gateway 5 offers the charging capabilities to third parties in a controlled and secure way. The function of this component is to validate third party identities, offer a charging API in a convenient form for the application and to do this in context with access to other operator provided capabilities such as location information, call set-up, bulk SMS and so forth. The OSA gateway 5 may also provide access to a short message centre 18

The use of a single centralized database for all accounts both subscriber and commercial partners, simplifies the overall management of the system and integrates revenue sharing with revenue collection into a single repository. This symmetry also allows the operator to apply many of the same credit management functions to commercial partners as to subscribers. This makes it feasible to support more, smaller partners via simpler commercial arrangements, indeed partners could work on a prepaid basis if so required. In the case of revenue sharing, the operator can extract his or her share, plus any additional costs (e.g. charges for account enquiries etc) prior to settlement and maintain a real-time view of their financial status vis-à-vis their partners.

The merging of pre and post paid models behind a single system allows subscribers to migrate between these forms conveniently and easily and supports hybrid forms e.g. family accounts giving children credit limits but the parents post-paid, all combined into the same account.

The use of a single rating engine 2 at the operator level enhances the operators' ability to differentiate their offerings through promotions, independently of their commercial partners. At the same time it reduces management complexity by offering a single point of provisioning of tariff data. Rating by the operator in no way precludes rating by the application provider, e.g. for on-line stores, but it does offer a point for promotions, taxation, mark-up, delivery charges etc. and to make the total charge visible to the subscriber prior to confirming the purchase.

The use of wallet functions offers enhanced security and convenience to the user. This enhanced confidence level will help stimulate on-line transaction volumes. This also enhances the operator's value to the third party merchants since it allows those merchants to access more of the credit potential in the operators' subscriber base. Full support of a pre-paid model allows the operator to build subscriber base of those unwilling or unable to get credit cards (e.g. teenagers) without taking undue credit risks and thus makes e-commerce fully available to that class of customer.

The OSA model provides a standards compliant way to package up these capabilities and offer the package to third parties without requiring extensive (and expensive) development and test cycles to guarantee network integrity. The OSA model does not just offer access to charging facilities but also delivers other network functions such as location information, call control etc. In addition the OSA gateway 5 can itself apply intelligence to the transaction. For example when a third party application requests location information from the network the OSA gateway 5 can also initiate an associating charging event. This supports both retail and wholesale models.

To simplify content-based billing, content value is differentiated by the location of the content (IP address or URL). This information is pre-provisioned statically as required by the operator. Thus if the operator enters a deal to provide premium rate access charges as a billing mechanism for a site, the operator implements the agreement by provisioning the relevant URLs as required into the GGSN 10. This is a sufficiently powerful solution to address most such requirements but does not impact network architectures or require an additional component in the network to perform the analysis thus avoiding a significant increment to cost, complexity, latency and resource usage.

The infrastructure also processes transport charges generated by network elements notably volume and duration based billing for voice/data over packet or circuit switched connections. Since this is the operator core business, these charges are always applied directly to the user account and the elements interface directly to the accounts database component which arbitrates the rating aspects in an extension of the current prepaid solutions to all accounts. Use of the common rating engine 2, support for multiple charges and holding of merchant accounts within the accounts database enables the sharing of charges amongst multiple parties and provides for revenue sharing e.g. 0800, Premium rate type functions.

Two primary call flows are supported corresponding to event charges or duration/volume charges. The flows below are generic and logical communications and need not always all occur.

Generic Event Charge Call Flow

Events of this style are generated by applications. However, these may be generated by the OSA gateway 5 on behalf of the application if required e.g. a location look-up request could always result in a charging request being generated. This would be the normal model for wholesale functions where the application provider is charged for the operation since the operator would wish to generate the charges.

1) Application sends Event Request for Authorisation to OSA Gateway.
2) OSA gateway forwards request to mcommerce enabler 4 with any additional data including authenticated application id.
3) Mcommerce enabler invokes the Rating engine 2 which returns price of event (possibly based on historical data etc). Note that the event may already have a price, but this is potentially changed via the Rating engine for taxes, vouchers etc.
4) Mcommerce enabler checks with policy whether authorisation and/or Advice of Charge (AoC) is required and preferred method of payment (account vs credit/debit cards etc)
5) If Authorisation is required, mcommerce enabler performs the necessary check (against balance or credit limit as appropriate)
6) Mcommerce enabler returns yes or no plus price and AoC (advice of charge) indicator to Application.
7) Application receives AoC and proceeds to perform event and then generates event confirmed/denied back to Control
8) Mcommerce enabler commits/revokes transaction (s) as required
9) All elements produce CDRs (Call Detail Records) as required for audit, reconciliation, marketing etc purposes.

Generic Duration/Volume Charges Call Flow

This follows the traditional prepaid call flow, but the destination data is required for the granularity of billing. It is necessary that this flow be heavily optimized.

1) Network element (MSC (Mobile Switching Centre) or GGSN) receives request for call or packet to/from destination
2) Network element requests a coupon from unified account database 1 per standard prepaid model in terms of time or volume with destination and source data. A coupon is also referred to as a quota, voucher, reservation, or bucket usually only if terms of currency.
3) The unified account database forwards to rating engine 2 to determine amount and account(s) to be charged.
4) The unified account database provides coupon or refers to recharge/credit increase
5) User interaction occurs and on exhaustion of coupon repeats from step 2)
6) On termination of interaction, partially used coupon data is returned to database and refunded to relevant account (s).

The coupon described above may set a number of parameters. These parameters may include, but are not limited to, volume, duration and an idle timer.

Since any interaction with a service is via some connection, the two charging models will occur in parallel. It is important for such activities to be coordinated. This is already supported in voice call processing through 800 style functions. We achieve this in the packet domain through use of destination charging rules provisioned in the GGSN 10. Where charging is related to content or application, rules within the GGSN will be triggered and this will result in different charging rates being applied. One such rate will be zero to the subscriber allowing for free interactions with applications. This allows charges for network usage to be suppressed, but for charges to be applied via the event mechanisms e.g. purchase of an electronic good such as an MP3, charges to be applied to the third party e.g. advertiser, or the interactions to be free e.g. access to a recharge application or other customer service function. Additionally, such mechanisms will support sharing of charges e.g. between application provider and subscriber for subsidised browsing, between application provider and operator for revenue sharing/premium rate sites and so forth.

Current pre-paid accounts are the model for this approach and are naturally supported. They have a credit limit of zero. This solution would allow for a soft limit of zero and a hard limit of a small amount to allow for controlled completion of current call/activity, for an "emergency" use and to generally improve customer relations. The agreement with the customer would announce the soft-limit, but the flexibility to go a bit over would generally improve usability and allow the operator to improve customer relations by being tolerant. Of course the hard limit could be the same as the soft limit to fully mimic today's solution.

Post-paid accounts would have some operator set credit limit, which could change over time or in response to customer request. This is exactly analogous to credit cards today and is necessary for the same reason since we envisage e-commerce transactions being charged to the phone account. In addition to the solution described above, the ability to prepare a bill for the user and also for merchant settlements and general accounting is required. This would come from post-processing the records cut by the unified account database 1 and through CDR/IPDR (IP Data Record) from the network elements to ensure complete alignment between account status and physical bill. Settlement of the account could be handled via an application to charge to the users credit card either interactively or by prior agreement.

By way of example, typical call walkthroughs for browsing, making a purchase and billing for that purchase are summarized below.

Call Walkthrough

User opens the URL to the Music Site

PDP context established in the usual way, allocating an IP address, charging ID, and establishes that user is prepaid MusicSite.com has no match in GGSN filters so GGSN requests coupon for normal rate which decrements the user account Browsing continues decrementing the normal rate coupon whilst on MusicSite.com User selects URL to preview the video Request now matches rule in GGSN filter (URL is sub part of MusicSite.com site) and is at a MusicSite rate GGSN requests coupon for new rate MusicSite2 rate is premium rate so coupon has debit to user and credit to MusicSite Debits made and coupon is provided Whilst the video plays, traffic still matches the filter and the premium rate coupon is decremented At the end of the video preview, User asks to be alerted when the Track is available—this is at normal rate so the normal rate coupon is decremented.

The confirmation screen has an ad for the current track for the band in question—since it is free user watches it.

Now it matches the adman rule and a coupon is acquired—however this time the costs are borne by Adman and no decrement to the User account occurs.

User ends the session—so the GGSN returns the unused portion of the coupons.

The Adman coupon was only a debit to the Adman account so the refund is a credit to the adman account The MusicStore Coupon was premium rate and transferred funds from User to MusicStore—so to refund User's account is credited but MusicSite's is decremented.

The Normal rate coupon is the credited to the User account.

Further Call Walkthrough

It is sometime later and the hot new track has hit the streets. In preparation, User's account has been topped up.

MusicStore app now sends an SMS message to the User using the OSA gateway 5 notification capabilities.

The next steps are those logically taken and the actual interactions will be optimised for bulk or small transactions particularly in relation to SMS.

OSA gateway validates the Storefront app and passes the request on to mcommerce enabler 4

Mcommerce enabler rates the request via the rating engine 2—this shows that it is a premium rate SMS and that User should be debited and MusicStore should be credited. Since the amounts are relatively small and the event is SMS, Mcommerce enabler policy says this can go ahead without user validation. So it executes the transaction and confirms to OSA gateway OSA gateway uses SMPP to send the SMS and confirms to MusicStore application User has been waiting for this clicks straightaway A context is set-up and the URL matches a rule and the relevant coupon is supplied—this time because it is a reduced rate browsing both User and the MusicStore are debited.

User selects track and hits "buy"

Storefront makes Charging request via OSA gateway which validates the storefront and passes the request onto the Mcommerce enabler.

Mcommerce enabler gets the event rated (based on the cost passed in by the app) and finds that there would be free minutes due to total mcommerce spend The amount is high and for an mcommerce transaction so mcommerce enabler has to get user authorisation and payment method selection—but can present the incentive of free minutes plus any other modifications as required. This is done by returning a suitable Wallet URL to User via the storefront.

User confirms the spend, and receives a token signed by mcommerce enabler which is then passed back to the storefront. Note that interaction with mcommerce enabler could be reduced or zero-rated, but for convenience were assuming it is rated the same as for the Mcommerce site.

Storefront confirms the transaction with mcommerce enabler via OSA gayeway and provides a onetime URL to the FTP (File Transfer Protocol) site where the MP3 lives.

User initiates the FTP. In this case, the merchant and the operator have agreed a fixed price for the delivery of the track and this was handled as part of the rating i.e credit to MusicStore was less than debit from User. So this is actually a free access URL and no counting/coupon is required.

Whilst the track is downloaded, User browses on the Music storefront at the reduced rate. Whilst IP multiplexes the packets for browsing and download, the GGSN filter ensures that only the chargeable packets cause the coupon to be decremented.

Once all is finished, user shuts down the outstanding coupon balance is refunded and User plays his new MP3 to all his friends.

The following charging scenarios are given by way of illustration and example.

Usage Based Charging:

Uses: browsing (especially public internet), voice call (either circuit or packet), video call (circuit or packet).

CS voice or video are suited to duration based charging with browsing being more volume based. Browsing could also move to a value based approach with a price per page rather than price per byte. This may be achieved for example by either by zero-rating the transport and requiring the web server to generate the event charge, or through IP sniffing capabilities, which would analyse the HTTP (Hypertext Transfer Protocol) sessions to determine page download and success. Further description on duration based charging is provided later.

Call Flow: call set-up triggers CDR creation in GGSN. Authentication at network level (i.e. MSISDN based) only. As user browses between sites, the GGSN matches site IP address/URL etc and places costs in the relevant tariff CDR. GGSN interfaces direct to the rating engine and the unified account database to perform rating and real-time usage based charges Event Based Charging:

Uses: For example, purchase of MP3 (desire to incorporate delivery charge into price i.e. zero rate the download but not the selection), find and Guide instance.

Call Flow: The network authenticates the user and GGSN establishes billing per usage based scenarios. The user connects to storefront and browses (packets being charge based on storefront, APN (access point name) and operator policy). The user selects MP3 track and hits buy. Storefront utilizes the OSA gateway 5 charging functions to request authorization for transaction giving amount. OSA gateway passes to the mcommerce enabler 4 which, using business rules, applies operator rating for taxation, mark-up etc. and determines the user payment method. MCommerce enabler then checks credit limits with either the unified account database 1 or via the payment gateway to the financial institutions based on user preferences, and checks back to user to confirm purchase. If approved, provides confirmation and transaction ID to the storefront, which provides MP3 (one time) URL to client. Client invokes download on URL. URL or server virtual domain/IP address is part of GGSN zero-rate filter. Downloaded packets are collected in the zero-rate bucket and no charge forwarded to the user account. On complete download (or perhaps after one-time URL allocated), the storefront indicates transaction complete to the OSA gateway and the mcommerce enaber then commits the transaction either to the user's account or directly to the financial institution. Payment occurs when the user and/or merchant account is reconciled through a transfer of funds (for example by charge to credit card).

For Find and Guide, instead of storefront charging for purchased goods, charging potentially occurs for the network based position location request, plus the delivery of the map information from the third party. The map itself could be downloaded free as per the MP3 case with transport charges included in the price per map. Settlement in this instance involves recognition of the split for location request, transport charges and the provision of a map.

Sponsored Charging:

Uses: Free, or credit (to end-user) access to recharge facilities, customer care, 0800 facilities/destination pays, advert download.

Call Flow: call set-up triggers CDR creation in GGSN. Authentication at network level (i.e. MSISDN (Mobile Subscriber Integrated Services Digital Network Number) based) only. User selects customer care. As user browses to free URL, these match the zero-rate filter for their APN and packets are not charged to the users account.

Ideally, usage charges in such will be cross charged to the content provider or sponsor. This may be done by the rating engine 2 on request of coupon for usage to the site. In the case of 0800, the rating determines a cost which is applied to the merchants account. Successful debit to the merchant account will result in allocation of a coupon and the browsing proceeds normally. This is identical to the mechanisms used to charge usage to the subscriber, only it is the merchant's account that is charged.

Premium Rate Charging:

Uses: Premium rate or reduced rate: Service fees via sharing of usage based revenue e.g. customer support (especially PCs), competitions, etc Call Flow: call set-up triggers CDR creation in GGSN. Authentication at network level (i.e. MSISDN based) only. User selects premium site. Destination based charging allows site to match an alternate rate filter. Cost sharing such as some kind of reduced call rate, would result in rating engine determining two (or more) transactions to the relevant co-funders (e.g. subscriber and content provider) all of which must succeed for the coupon to be allocated. Unused balance refunds are performed via the inverse operation. Premium rate content provided via generating a higher cost to the subscriber and crediting the merchant account on allocation of a coupon. Unused balance results in refund to the subscriber and debit to the content provider. Some forms of taxation may be addressed via a similar mechanism if required.

Value Based Charging:

Uses: charge differently for VoIP(Voice over IP)/Video Streaming for other packet services to ensure competitive voice offer, real-time stock quotes, goal flashes, etc.

Call flow: Similar to event based charging (e.g. per goal flash or stock quote), application can generate charging request via charging SCF.

It will be understood that the above description of a preferred embodiment is given by way of example only and that various modifications may be made by those skilled in the art without departing from the spirit and scope of the invention.

It will further be understood that, although the apparatus and method have been described above with particular reference to a wireless network, they are in no way limited to wireless applications and are equally applicable to other network architectures.

Duration Based Charging:

Uses: charge for data services on a duration basis rather than a volume basis. This may be better for the end-user since the volume of data required to deliver a web page is not predictable or even obvious, whereas duration is a familiar charging concept.

For duration based charging it is necessary to determine both start and end times. The start time will often be easy to determine as the time when the first data passes determining the end time is more complex.

There are a number of ways to handle duration including:
1. a typical parking meter approach where for a fixed amount, the user gets a fixed period of access. In this case the end time is the start-time plus the fixed period.
2. a visit based approach where the end-time is heuristically determined, i.e. the visit ends when there is no network traffic to the visited area for some period of time. This is an idle timeout. Granularity of charging (per hour, per minute, per second) is an operator choice since the total visit duration is reported.

Other mechanisms are possible notably analyzing the protocols for start and stop such as HTTP get and reply pairs or TCP (Transmission Control Protocol) session lifetimes. These methods are not recommended since such sessions may easily overlap and also the end message may never come e.g when browsing you don't necessarily close the browser. In general, they may work well for some specific applications but especially for the access outside the walled garden where by definition nothing is known about the destination or service, these are not sufficiently reliable to be the basis for billing.

The Parking Meter approach can be implemented through the following coupon settings: Volume and idle timer unlimited, duration to the fixed period. The coupon will remain valid through the fixed period. The charge will be deducted on coupon allocation and no refund is necessary. As soon as another request flows after the coupon expiry time, then the GGSN 10 will request another token thereby initiating the next interval of time. The key to success is setting price and period to match user activity making the trade-off between granularity and the number of coupons used which reflects the load on the rating and billing server. If the granularity is too fine (I,e the duration is short), then many coupons will be requested increasing the load on the rating and billing system. If the granularity is too coarse then the price will be higher and perhaps put people off. In between will be a sweet spot but ideally the duration would be the smallest period that covers the majority of usage patterns. A half hour period could prove expensive if a typical usage was to look up a single page every couple of hours.

The Visit model relies on matching the timeout to usage patterns especially since reading a web page can take a while. Too short and there will be many visits in the limit each web page could constitute a visit. This may unnecessarily load the rating and billing system. Too long and many user perceived visits may get combined into one with the consequence of charging for what the user perceives as idle (and hence free) time. Usage patterns of the operator subscriber base would need to be analysed for the correct value, but something of the order of 15 minutes would be a good starting point.

Both these models allow concurrent sessions within the same single charge and also allow other events such as access within the walled garden or voice calls to occur without significant impact to the charging model.

The "walled garden" refers to a situation where a network operator allows subscribers to access certain services (perhaps provided by the network provider themselves) but prevents access to any other services.

Charging systems may also be required to operate with optimisers in the network. Optimisers change the content that passes through them, for example, so that the content is suitable for the specific user device (Personal Digital Assistant, mobile phone, etc.), e.g. a WAP (Wireless Access Protocol) Gateway.

A further issue is if the content changes so much that the parameters upon which the flow differentiation is performed are unrecognizable or even wrong (e.g when data is addressed to the optimizer rather than to the end server). The WAP Gateway is an optimizer in that for WAP 1.x it takes the http flow from the server and translates to WAP protocols over the air with traffic from the MS being address to the WAP Gateway. In WAP 2.0 the traffic is HTTP end to end, but the lower protocols are still changed by the WAP gateway.

In order to work with optimisers the GGSN may have built in understanding of the optimiser protocols, e.g. WAP protocols for 1.x and 2.0. Thus it can correctly apply the CBB rules to the content that is actually delivered over the air interface so the user pays for what they get and not the potentially graphics intensive page that from the original server.

Alternatively the optimiser may be run on the GGSN itself, which would simplify the network architecture but may impact the capacity of the GGSN.

With all billing mechanisms, it may be important that the subscriber is aware of the cost of the service, that they are about to use (so called 'Advice of Charge', AoC). This AoC information may be displayed to the user in a number of ways, including:
1. Web/WAP proxy: In this approach, the offnet browsing traffic is intercepted by a web proxy which replies with the advice of charge information. The generated page contains an OK button which continues the original request or a No button which returns to the previous page or perhaps a home page—something at the normal rate or free.
2. GGSN Captive portal page: This is the same as the web/wap proxy but the trigger for the new page is handled from the GGSN itself. The advantages over the proxy server solution are twofold, firstly it reduces the need for proxy servers which add latency to all requests routed through them. Secondly it leverages the provisioned list for CBB and therefore potentially requires less provisioning than the web server approach and more accurately reflects the rules on which actual charging is based.
3. Out-of-band solution: In this model, the traffic requiring AoC is detected, but unlike the captive portal approach, the traffic is suspended and the AoC is pushed back to the terminal via another mechanism e.g. WAP Push. This approach requires support on the terminal. It is superior to the captive portal solution on that it works for all traffic and not just browsing sessions. However, by suspending the traffic flow pending out-of-band AOC confirmation, it may cause the request application to time-out.

4. Terminal based solution: In this model the terminal itself would distinguish which traffic would require such an AoC. This would require some low-level client in the handset and over-the-air provisioning of any rules required. Such rules would need to be simple and small to minimize the overhead on the constrained processing environment typical of a mobile handset. One way might be to provide a pattern match on the destination IP address, the operator would provide IP address for all supported servers perhaps within some specific subnet with all off net traffic being charged at the external rate. This limits the differentiation and also limits the precision of the data to be displayed—it is unrealistic to expect the handset to do rating calculations, so some generic message about charges would be most likely. This would not constitute a fraud window since it is only the warning that is being conveyed the terminal is not responsible for generating actual charging data, but there would be the cost of managing such code across all terminal types and potential for liabilities if problems occur.

The ability of UMTS (Universal Mobile Telecommunications System) to support multiple bearers with different QoS (Quality of Service) can lead to new commercial opportunities such as a "go faster" option. With this, the user could be offered the option (at a suitable price) to perform a large download faster through establishing a secondary PDP context with a higher data rate. The GGSN is aware of which PDP context packets have flowed over or will be routed to and so can differentiate flow based on the POP context.

The following use scenarios are provided by way of example only. For the purpose of the walkthroughs, it is assumed that the network is divided into two being inside the operators' walled garden and outside. In addition we assume that a GGSN captive portal approach to advice of charge is used (a web proxy approach would be similar and in the first use case a reference to the terminal based solution occurs). We assume that inside the walled garden is free, but that some tracking is required for analysis and settlement purposes. Outside the walled garden is the public internet and this is charged on a usage basis. For the sake for argument, each scenario suggests a tariff model with the intent of showing how the model works and not as a suggested pricing. Users are assumed to have connected and set-up a PDP context with by default an interactive class 64 kb/s UL and 128 kb/s downlink. In all use cases, the GGSN also creates a G-CDR for the user session which contains volume information showing how much traffic went to each rating bucket (I,e per rule). In the case of traffic outside the walled garden, this would be one count. This data could be used for settlement and revenue share purposes if required.

Public Internet Browsing—Duration Meter

Scenario: Emily wants to find a new MP3 track. So she visits a suitably licenced public MP3 site to download it. The site is on the internet and outside the walled garden. The wireless operator charges outside access via the parking meter model. This is to charge 1 Euro for an hours access to the outside world. Advice of charge is in operation.
Walkthrough
1. Emily enters the URL: www.legalMP3s.com. [Note that if the terminal based AoC was used, terminal client detects that this is an offnet request and interacts to alert/confirm with the user in some way.]
2. packet hits the GGSN and the GGSN starts to match the CBB rules. Since this is outside the walled garden, it is caught by the default rule. Since this is the first such access, there is no coupon for this and this hits a captive portal trigger for AoC.
3. The GGSN captures the session and diverts to a captive portal server which provides a web page with the Advice of Charge information. In collaboration with the rating engine 2 this can precisely indicate the charge and allow for bundled minutes etc if required. The page is sent back as the reply to Emily's request.
4. Emily's browser displays the AoC page asking is this ok. If Emily says "no" then she goes back to the previous page and no charge is made. If she does nothing then the page simply sits there with no charge. In this case Emily presses "Ok" which is actually a link to her originally requested page.
5. Now the GGSN requests a coupon for Emily from the unified account database 1.
6. The unified account database checks Emily's credit rating for example to see if she has any free time bundled into her subscription etc. She hasn't so it decrements her account by 1 Euro and provides a coupon with unlimited volume, 1 hour duration and a 1 hour timeout. By setting the timeout equal to or greater than the duration, we ensure that the coupon doesn't timeout. Note that the duration starts when the coupon gets to the GGSN i.e just after Emily pressed OK and she is only charged for duration from the point she pressed ok.
7. The request is forwarded to the MP3 site. Emily browses the site for her track. Downloading the track with the 128 kb/s will take a few minutes but she can do several in her hour's time and 1 Euro for the access isn't a lot to pay.
8. If she goes to other locations or receives a phone call, the coupon stays valid until an hour after she first pressed ok.
9. If she chooses to visit other sites outside the walled garden during the one hour period, the same coupon applies and there is no additional charge
10. If she is still browsing or downloading from an outside site when the hour expires, a new coupon is required. Whether AoC is repeated would be configurable—may be only one alert per day or perhaps one alert per coupon. However, coupon renewal would incur another 1 Euro charge and enable another one hour period for out of garden access.

This approach is quite attractive in that it is simple to understand and provides good value for users downloading files or interacting with e-mail servers with attachments etc. For users who only want to look up a single page perhaps weather forecast or stock quote, this may be expensive, however, many of those services may be within the walled garden.

The maximum number of coupons for out of garden access is one per charging period for an hourly charge this isn't too arduous. However, reducing the period to say 15 minutes would likely be a significant impact on the rating and billing systems.

Public Internet Browsing—Timed Visit

Scenario: Similar to the previous scenario, except the user is on a different tariff. Chris wants to find a new MP3 track. So he visits a suitably licensed public MP3 site to download it. The site is on the internet and outside the walled garden. His wireless operator charges side outside access via the visit model. This is to charge 0.0005 Euro per second for access to the outside world plus 0.20 Euros per visit. Advice of charge is in operation.

Walkthrough

1. Chris enters the URL: www.legalMP3s.com.
2. The packet hits the GGSN and the GGSN starts to match the CBB rules. Since this is outside the walled garden, it is caught by the default rule. Since this is the first such access, there is no coupon for this and this hits a captive portal trigger for AoC.
3. The GGSN captures the session and diverts to a captive portal server which provides a web page with the Advice of Charge information. In collaboration with the rating engine this can precisely indicate the charge and allow for bundled minutes etc if required. The page is sent back as the reply to Chris' request.
4. Chris' browser displays the AoC page asking is this ok. If Chris says "no" then he goes back to the previous page and no charge is made. If he does nothing then the page simply sits there with no charge. In this case Chris presses "Ok" which is actually a link to his originally requested page.
5. Now the GGSN requests a coupon for Chris from the unified account database
6. The unified account database checks Chris' credit rating for example to see if he has any free time bundled into his subscription etc. He hasn't so a coupon must be allocated. Here it is possible that the rating and billing engine may apply heuristics based on usage patterns and or remaining credit etc. Since some amount of credit will be tied up, this is an operator decision to trade-off between liquidity and coupon frequency. For comparison, lets say that the operator allocates 2 Euro of credit i.e. decrements 2 Euro's from Chris account. Of this 0.20 Euro is the per visit charge and 1.80 Euro is therefore available allowing up to 3600 seconds of time charge i.e. 60 minutes. So the coupon is set to unlimited volume, 1 hour duration and sets the idle timeout to 15 minutes. It also sets a visit started flag in the users record. Note that the duration starts when the coupon gets to the GGSN i.e. just after Chris pressed OK and he is only charged for duration from the point he pressed ok.
7. The request is forwarded to the MP3 site. Chris browses the site for his track. Downloading the track with the 128 kb/s takes a few minutes and he decides to do another one too. Overall he spends 13 minutes and 37 seconds browsing and then goes to do something else.
8. Fifteen minutes later, the idle timer expires and the coupon is returned.
9. The unified account database notes that the coupon was returned after an idle timeout and hence that the visit has terminated i.e. resets the visit started flag. It therefore refunds 1 hr less 13 minutes and 37 seconds i.e. 2783 seconds or about 1.40 Euros. So effective charge was 0.60 Euros, pretty neat but he did have to check his balance to find out—he's never quite sure how much things cost.
10. If he chooses to visit other sites outside the walled garden during the one hour period, the same coupon applies and the clock is still ticking. The idle timer is only reset if he visits an outside site (or if the download is happening in the background). If he does not, then the idle timer expires and the coupon is returned as per 8 and 9 above. Similarly if he received a voice call and stopped accessing the net, then again the idle timer may cause the visit to finish.
11. If he is still browsing or downloading from an outside site when the hour expires, a new coupon is required. The GGSN optionally does AoC but refreshes the coupon from the unified account database
12. The unified account database notes that the coupon is returned on duration expiry and that a new coupon is required. Since the visit started flag is set, no new visit charge is applied and a new coupon is allocated with another hours worth of visit time and the browsing session continues.

This model can be quite effective for focused access to a resource outside the walled garden. Short visits do well for this but interruptions can cause multiple visits if they are long. If the interruptions are short, then they end up being billed as time spent outside the walled garden which may be disappointing. The minimum coupon duration is the idle timeout, so this could be coupon intensive if the timeout is around 15 minutes. However, the idle timer reflects that the user has stopped interacting so it is unlikely that the coupon will be renewed immediately on idle expiry.

The invention claimed is:

1. A method of billing a communications network user for the purchase of goods or services associated with the transport of packet traffic from that communications network into a packet communications network, each packet having an address which identifies a provider of goods or services, wherein the method is executed by a server and comprises:
   accessing, by the server, a set of rules,
   determining, by the server, from said rules and each packet address, a respective billing tariff and a network user account to be debited for the transport of that packet,
   obtaining, by the server, a coupon from an account database, representing an amount of credit, and
   debiting, by the server, a network user account by the amount of that credit, before allowing the transport of packet traffic for that network user.

2. The method of claim 1, wherein account details for network users and account details of providers of goods and services are stored in a common accounts database.

3. The method of claim 2, wherein transfers of credit between accounts stored in the accounts database are determined from coupons generated for each transaction.

4. The method of claim 3, wherein network users have prepaid and postpaid accounts.

5. The method of claim 4, wherein each user account is accorded a respective credit limit.

6. The method of claim 5, wherein a user validation is performed prior to completion of a transaction.

7. The method of claim 6 wherein the network is a wireless network.

8. A billing system for providing combined billing of a communications packet network user for the delivery of communications services to that user and for the on-line purchase of goods and services by the user via the communications network, the goods and services being associated with the transport of packet traffic wherein each packet includes a packet address, the billing system comprising:
   a database having stored therein a set of rules; and
   a server communicatively coupled to the database, the server being configured to:
   determine from said rules and each packet address, a respective billing tariff and a network user account to be debited for the transport of that packet,
   obtain a coupon from an account database, representing an amount of credit, and debit a network user account by the amount of that credit, before allowing the transport of packet traffic for that network user.

9. The billing system of claim 8, wherein network users have prepaid and postpaid accounts.

10. The billing system of claim 9, wherein each user account is accorded a respective credit limit.

11. The billing system of claim 10, wherein the server is configured to credit a supplier of goods or services a portion of the network operator's revenue for the transport of packet traffic relating to a transaction.

12. The billing system of 11, wherein said network comprises a wireless network.

13. A non-transitory machine readable medium comprising a plurality of instructions that, in response to being executed, result in a computing device determining from a set of rules and each packet address, a respective billing tariff and a network user account to be debited for the transport of that packet, obtaining a coupon from an account database, representing an amount of credit, and debiting a network user account by the amount of that credit, before allowing the transport of packet traffic for that network user.

14. Apparatus for billing a communications network user for the purchase of goods or services associated with the transport of packet traffic from that communications network into a packet communications network, the apparatus comprising:

means for providing each packet with an address which identifies a provider of goods or services, a store having a set of rules, a packet analyzer for determining from said rules and each packet address, a respective billing tariff and a network user account to be debited or credited for the transport of that packet; and means for obtaining a coupon from an account database, representing an amount of credit, and debiting a network user account by the amount of that credit, before allowing the transport of packet traffic for that network user.

15. Apparatus as claimed in claim 14, wherein network users have prepaid and postpaid accounts.

16. Apparatus as claimed in claim 15, wherein each user account is accorded a respective credit limit.

17. Apparatus as claimed in claim 16, wherein said network comprises a wireless network.

* * * * *